Dec. 17, 1935.  E. BENNETT  2,024,906
METHOD OF HEATING ELECTRICALLY CONDUCTING BODIES
Original Filed March 11, 1932
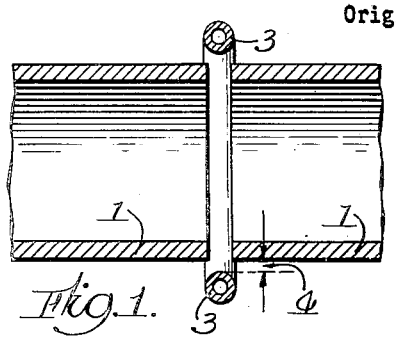
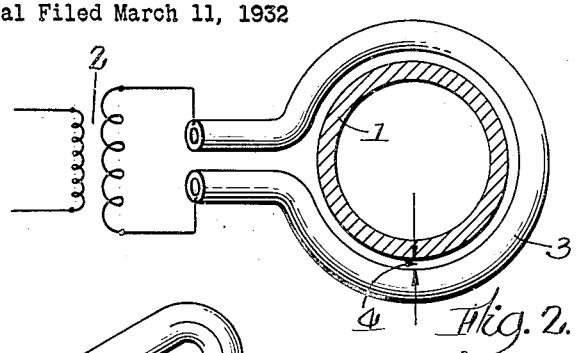
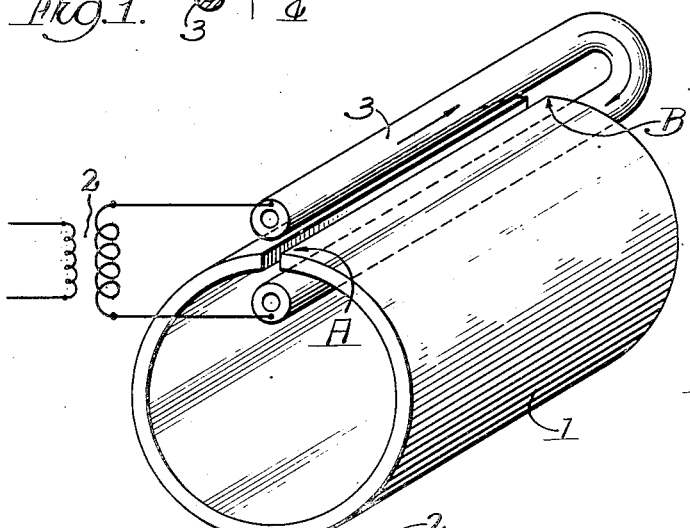
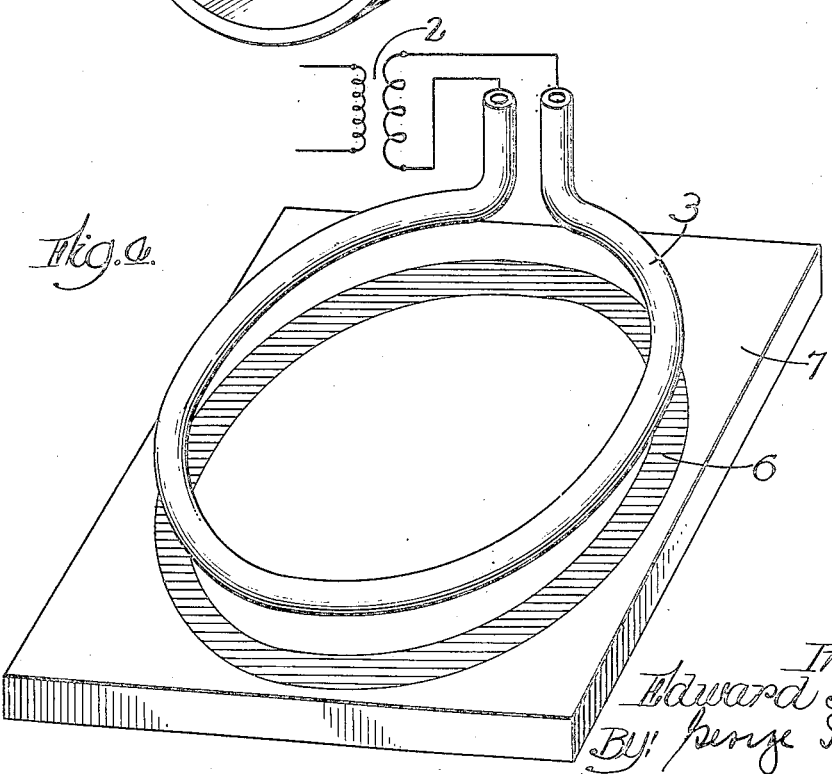
Inventor:
Edward Bennett
By: George I. Haight
Atty.

Patented Dec. 17, 1935

2,024,906

UNITED STATES PATENT OFFICE 2,024,906

METHOD OF HEATING ELECTRICALLY CONDUCTING BODIES

Edward Bennett, Madison, Wis., assignor to Wisconsin Alumni Research Foundation, Madison, Wis., a corporation of Wisconsin Application March 11, 1932, Serial No. 598,127
Renewed April 22, 1935

3 Claims. (Cl. 219—13)

The invention herein described relates to improvements in the electrical method of heating to the desired temperatures predetermined portions of conducting plates, tubes, shapes or bodies, constituting the subject-matter of my co-pending application Serial No. 545,568, filed June 19, 1931. The feature of that invention is the method of controlling the heat by electrically causing the heating current in the body to concentrate in the portions of the bodies in which the heating is desired. This is accomplished by the utilization of frequency and close proximity of an impulsive, oscillatory or alternating current related in a manner to concentrate the current in the desired zone or area.

In the present invention this method is carried out by inductively relating the conductors and the work in a manner that an inducing current, of predetermined frequency, such as an impulsive, oscillatory or an alternating current, is caused to flow in a conducting loop which is held in close proximity to the work, whereby the frequency of the current in relation to the proximity of the loop to the work will cause the heating current induced in the work to be concentrated in the strip or zone desired.

The varying current in the loop induces electric intensities in the conducting body or work, and under these intensities a heating current flows in the desired zone or strip in the conducting body. To cause this heating current to concentrate to the desired degree in a predetermined strip, I use in the conducting loop an inducing current whose frequency of alternation is much higher than the frequencies of 25 and 60 cycles in general use for heating operations, and I shape the inducing loop so that it may be positioned in the necessary degree of proximity to the work to accomplish the desired concentration of heating element.

One of the objects of my invention is to make possible heating operations which are not possible when using the methods at present in use, and to lessen the cost and improve the quality of industrial operations by reason of the superior control of the heating operation which my method provides.

The manner in which my method is carried out is illustrated in the accompanying drawing forming part of these specifications.

In the drawing,

Fig. 1 illustrates in longituidnal section two tubular members, together with an inducing loop in close proximity to the ends of the tubes which are to be heated and joined together;

Fig. 2 illustrates a transverse section of one of said tubular members, together with the inducing loop encircling the tube;

Fig. 3 illustrates an inducing loop in heating relation to the longitudinal edges of a tubular member to be joined; and Fig. 4 is a perspective view illustrating an inducing loop in proximity to the surface of a flat conducting plate or body in which a strip or zone thereof is to be heated.

The elements 1—1 represent the plates, tubes or bodies which are to be heated to any desired temperature along the desired strips or portions. These pre-selected strips or portions are determined by the positioning of the coil 3 in close proximity thereto. The bodies to be treated must be conductors of electricity.

The primary source of the alternating current may be a suitable electro-magnetic generator, a thermionic generator or an arc generator, generally connected to the work through a suitable transformer 2. The transformer is therefore regarded as representative of the source of current for the purpose. The primary source of the oscillatory current and of the impulsive current may be the oscillating and the dead-heat discharge of condensers, respectively. In these cases also the primary source will generally be connected to the shapes through a suitable transformer. The numeral 3 designates the "inducing coil". This inducing coil is supplied with alternating, oscillatory or impulsive current by connecting it across the source 2. The coil is preferably constructed of such a shape and size that the desired degree of proximity to all or substantially all of the length of the strip which it is desired to heat by the induced currents. The inducing loop may consist of many turns of wire or of a single conducting turn. It may be cooled by any suitable means. For example, the loop may consist of a copper tube, cooled by flowing water through it, and covered with thermal insulating material to keep it from cooling the strip in which the heating current is induced. This thermal insulating covering may also serve as an electrical insulator to keep the loop from making contact with the body to be heated.

For the sake of clearness, in Fig. 1 it has been necessary to illustrate the inducing loop at some considerable distance from the members 1 representing the work to be heated. It should be understood, however, that in the practice of my invention, the distances 4 (Fig. 2) from points of the inducing loop and corresponding points of the strip to be heated are relatively small, of the order of a few millimeters or a few centimeters, preferably so that the frequency may be maintained as low as possible.

To now describe in more detail the special features shown in the drawing, Figures 1 and 2 show a method of using my invention to cause heating currents to flow in strips which lie at the ends of two electrically conducting tubes, the tube being shown in longitudinal section, for the purpose of heating these ends to any desired temperature, as for brazing or welding operations.

The ends to be heated are positioned to form a butt joint when completed, and although shown separate for purposes of illustration, the ends may be in actual abutting relation. These abutting ends are encircled by the inducing coil 3. When current from the source 2 flows in the inducing coil, a heating current is induced in and caused to flow in a circumferential path in the tubes, which is located by the position of the coil. The current density induced in the tubes is maximum immediately adjacent to the inner face of the inducing coil and becomes less and less in circumferential paths farther and farther removed from the inducing coil. The less the separation 4 between the coil and the abutting ends, and the higher the frequency of alternation of the inducing current, the more rapidly does the current density in the tubes drop off as the distance from the abutting ends increases. At commercial power frequencies of 25 and 60 cycles per second, the heating current would be dispersed or distributed over strips of considerable width, but at the higher frequencies which I use, the heating current is largely confined or concentrated in narrow strips bordering the abutting ends.

Many factors which vary from job to job such as the kind of material in the tubes, the nature of the operation to be performed, the relative cost of generating energy at the different frequencies, serve to determine the range of the frequencies which are the most economic to use in the practice of my invention. My present experience indicates that these economic frequencies can be expected to fall between 1000 and 10,000 cycles per second.

While Fig. 1 shows the two tubes as abutting, and as encircled by an inducing coil whose inside diameter is greater than the outer diameter of the tubes, it is obvious that other arrangements may be used. For example, I may separate the abutting ends to a distance a few millimeters or a few centimeters greater than the width of the inducing coil and I may place in the gap between the ends an inducing coil whose mean diameter is roughly equal to the mean diameter of the tubes. Of course, in this latter case the inducing coil must be withdrawn before the tube ends can be butted together for an operation such as welding. In Fig. 1, the inducing coil has been shown outside the tubes. I may place the inducing coil inside the tubes, or two coils may be used, one inside and one outside the tubes. Of course, I may omit one of the tubes of Fig. 1 and induce the heating current in the end of one tube only. Or I may slip the inducing coil along the tube to any position and induce a circumferential heating current in a strip of the pipe immediately adjacent to the inner face of the inducing coil.

Figure 3 illustrates the application of my invention to the induction of heating current in strips along the two abutting edges of a plate 1, which has been rolled into the form of a tube preparatory to brazing or welding the two abutting edges. In this arrangement, the inducing coil 3 has two long parallel legs, and the coil is mounted so that these two legs are parallel with and closely adjacent to the abutting edges which are to be heated, the legs being disposed on opposite sides of the plate 1.

The two long legs of the inducing coil, which I will call the outgoing and the return legs are each in close proximity to the strip to be heated, and on opposite sides or faces of the plate. This is an effective arrangement since the current in both legs is advantageously situated to induce heating currents in the desired strip in the body to be heated. With this arrangement the stream lines of the induced current in strips near the abutting edges are closed loops passing, say, from end A to end B on and near the outside surface of the tube, thence through the plate at end B to similarly located lines on and near the inner surface of the tube, thence along these lines near the inner face from end B to end A, and thence through the plate near end A to close the loop. However, in the practice of my invention it is not necessary that both the outgoing and the return legs of the inducing coil shall be in close proximity to the strip to be heated. It is sufficient to have one of the legs, which we may arbitrarily designate as the outgoing leg, made effective by being positioned in close proximity to the strip. Again, if mechanical or other manufacturing considerations do not permit or do not warrant the placing of the two legs adjacent to opposite faces of the plate, then both legs may be outside or both legs may be inside the tube. But in such cases the return leg should be remote from the strip.

Figure 4 is representative of a condition wherein the strip of the body to be heated is a closed loop rather than a strip which is straight or of any shape having a beginning and an end. When the strip constitutes a closed loop, the inducing coil throughout its entire length may be located closely adjacent to the strip. The heating current is concentrated in a strip 6 of the plate 7. It is thus apparent that whatever irregularity in shape the inducing coil 3 may be given in proximity to the plate, the heated zone or strip will follow the same irregularity of said inducing coil.

The degree to which the induced heating current concentrates in a predetermined strip of desired width depends primarily on the degree of proximity of the inducing coil to the work in this respect that the degree of proximity determines the selection of the proper frequency for the purpose, which purpose is to effect the desired location and temperature of the heat developed. Thus in determining the factors necessary to produce a given result, it is generally preferable first to arrange the inducing coil in the closest possible proximity to the work consistent with practical considerations and then adjust the frequency to the necessary degree to effect the desired concentration of induced heating current.

My method of selectively controlling the heating of bodies by causing the heat energy to be generated in, or delivered to, the body in predetermined strips of predetermined width and depth, makes possible a hitherto unattainable nicety of control of the distribution of temperatures in the bodies. This control of the temperature pattern I obtain by adapting both the rate at which I apply the energy and the current density pattern to the desired end. For example, in the welding of plates edge to edge, if the induced heating current is for all practical purposes to be confined to a strip a few millimeters deep on the edge of the plates, and the power delivery is made large by using large inducing currents, portions of the plate a few centimeters from the edge will be substantially at room temperature when the edge reaches a welding temperature. On the other hand, if the energy is delivered at a more moderate rate, that is if smaller inducing currents are used, the temperature gradient in the body at the time the edge reaches a welding temperature may be made much more gradual. It will be seen that this hitherto unattainable control of the temperature patterns in industrial heating operations, is accomplished by reason of the fact that my invention makes it possible to confine the delivery of energy to the body to the strips or portions of the body to be treated.

I have described my invention by showing how it is applied to a few shapes, but my invention is not limited in its application to the particular shapes used for illustration, neither is it limited to the case in which the edges or heated strips are to be welded together after the heating operation. The heating may be for any other useful purpose such as upsetting, forming, annealing or hardening operations or even of melting the material along the heated strip.

Any selective electric heating operation in which by means of an alternating oscillatory, or impulsive current of suitable frequency in an inducing coil, a heating current is induced in the body to be selectively heated, and in which the heating current is caused to concentrate to any desired degree in predetermined strips by the expedient of shaping and proportioning the inducing coil so that the coil, or some portion of the coil, extends along the strip in close proximity thereto, comes within the scope of my invention.

I claim:

1. As an improvement in the art of electrically heating conducting bodies by induced currents, the method of concentrating the heating current in a predetermined strip in the body, consisting in positioning an inducing coil in close proximity to said body, a portion of an inducing coil corresponding to the predetermined strip, and causing to flow in said coil an alternating, oscillatory or impulsive current of the necessary frequency and magnitude to concentrate the induced current in said predetermined strip.

2. In the art of electrical heating conducting bodies, the method of producing the heat and confining it to predetermined strips in the body, consisting in providing the coil and impressing upon said coil a varying current of relatively high frequency from a suitable source thereof, and positioning along the predetermined strip to be heated a portion of the coil corresponding to the length of said strip, and in such close proximity to said body that the current induced in said body will be confined in its flow along said predetermined strip by virtue of the electrical phenomena known as the proximity effect.

3. The method of selectively heating electrically conducting bodies, which consists in selecting the strip in the body to be heated, passing an inducing current of relatively high frequency in a current conducting loop, and positioning in close proximity to said selected strip a portion of the loop corresponding to the length of the selected strip, the degree of proximity of said portion of said loop in relation to the frequency of the inducing current being such as to utilize the electrical phenomena known as proximity effect for concentrating in said selected strip the current induced in said body.

EDWARD BENNETT.